J. U. BARR.
GOGGLES OR EYE PROTECTORS.
APPLICATION FILED OCT. 23, 1915.
1,257,667.
Patented Feb. 26, 1918.
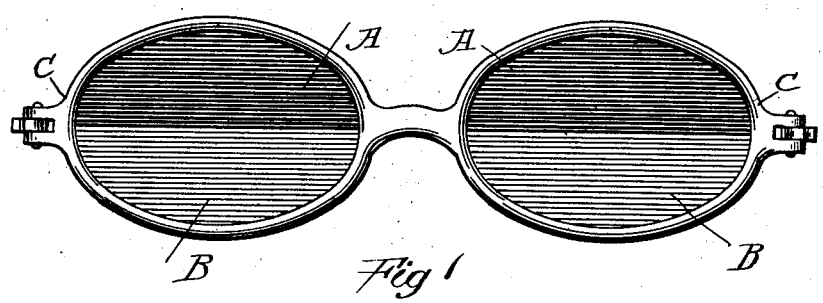
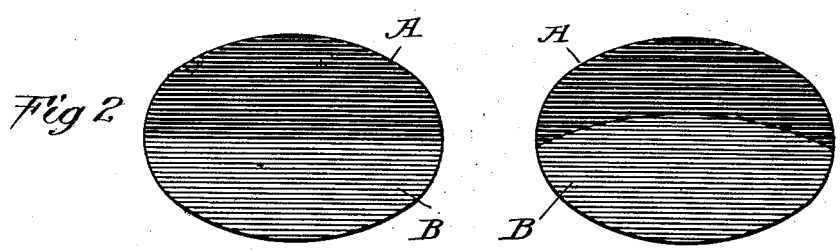
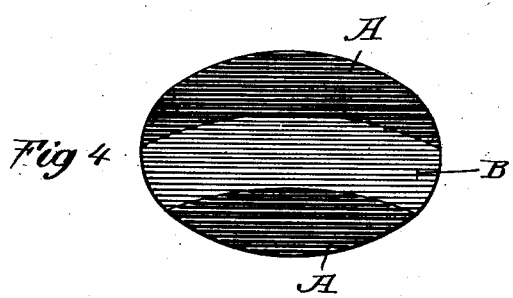
John U. Barr, Inventor
By his Attorney
Samuel E. Darby

UNITED STATES PATENT OFFICE.

JOHN U. BARR, OF NEW YORK, N. Y.

GOGGLES OR EYE-PROTECTORS.

1,257,667.  Specification of Letters Patent.  Patented Feb. 26, 1918.

Application filed October 23, 1915. Serial No. 57,591.

*To all whom it may concern:*

Be it known that I, JOHN U. BARR, a citizen of the United States, residing at New York, in the county and State of New York, have made a certain new and useful Invention in Goggles or Eye-Protectors, of which the following is a specification.

This invention relates to goggles or eye protectors.

The object of the invention is to provide goggles or eye protectors which are simple and efficient.

A further object is to provide goggles or eye protectors which in one portion thereof afford protection to the eyes of the wearer against the dazzling and blinding effects of brilliant light without destroying vision through such portion, while at the same time, in another portion thereof, affording a restful protection to the eyes for use in ordinary light without impairing the vision through such portion.

Other objects of the invention will appear more fully hereinafter.

The invention consists substantially in the construction, combination and arrangement, all as will be more fully hereinafter set forth, as shown in the accompanying drawing, and finally pointed out in the claims.

In the drawings:

Figure 1 is a view showing a goggle employing my invention.

Figs. 2, 3, and 4, are views of glasses for use in goggles and embodying my invention.

In carrying out my invention I employ transparent material, such as plain glass, mica, celluloid, or the like, of substantially uniform thickness throughout and cut or formed to the desired shape and contour to be fitted into a smaller frame for use. I shall refer to a single piece of such material so cut and formed, as a "glass", intending, however, by such term to include not only plain glass, but also mica, celluloid or other suitable transparent material.

I propose to use plain glass or other transparent material of substantially uniform thickness, and in one piece, which is or has been, uniformly tinted, shaded or colored throughout, and, in accordance with my invention, I construct one portion of such glass with a deeper or darker tint, shade or color than another portion thereof, and preferably the darker colored or shaded portion is sharply defined from the lighter colored or shaded portion.

In the drawing the single piece of plain transparent material, of substantially uniform thickness has one portion A thereof uniformly colored, shaded or tinted to a greater density than the portion B thereof, which portion B, however, in accordance with my invention, is also tinted, shaded or colored uniformly, the two portions A and B, being sharply defined from each other.

The lighter transparent and colored portion B may be either at the top, or at the bottom, or through the middle of the glass. In Fig. 2 the darker portion A is the top portion. In Fig. 3 the two portions are defined from each other along a curved line. In Fig. 4 the lighter portion is through the middle of the glass, the upper and lower portions being more deeply colored.

A pair of glasses constructed as described, and fitted to a usual and suitable goggle frame C, affords an efficient protection for the eyes against blinding or dazzling lights, through the darker colored portion, and against ordinary light through the lighter colored portion, without, in either case interfering with the vision through the transparent glass. The eye is not strained by gradually varying densities of shade. Goggles constructed as described while well adapted for general use are particularly efficient for use by automobilists, particularly at night time to prevent the eyes from being blinded by the dazzling head lights of an approaching machine.

I am aware that it has been proposed to construct goggle glasses with one portion colored or shaded and another portion clear and colorless, and I make no claim to such a device.

But having now set forth the objects and nature of my invention and a construction embodying the principles thereof, what I claim as new and useful, and of my own invention, and desire to secure by Letters Patent, is, —

1. A goggle having glasses each of a single piece of transparent material of substantially uniform thickness, and colored or shaded throughout, and having one part more deeply colored or shaded than another part.

2. A goggle having glasses each of a single piece, of transparent material of substantially uniform thickness, and colored or shaded throughout, and having one part more deeply colored or shaded than another part, the more deeply shaded part being sharply defined from the lighter shaded part.

In testimony whereof I have hereunto set my hand in the presence of the subscribing witness, on this 20th day of October, A. D. 1915.

JOHN U. BARR.

Witness:
   S. E. DARBY.